(12) United States Patent
Martinsson

(10) Patent No.: US 6,594,263 B1
(45) Date of Patent: Jul. 15, 2003

(54) ATM THROTTLING

(75) Inventor: Olle Martinsson, Vänersborg (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/002,773

(22) Filed: Jan. 5, 1998

Related U.S. Application Data

(63) Continuation of application No. PCT/SE96/00887, filed on Jul. 5, 1996.

(30) Foreign Application Priority Data

Jul. 6, 1995 (SE) .............................................. 9502468

(51) Int. Cl.[7] .............................................. H04L 12/56
(52) U.S. Cl. .................. 370/395.42; 370/412
(58) Field of Search ................................ 370/229–240, 370/252, 253, 389, 392, 395, 412–418, 465, 468, 395.1, 395.4, 395.42, 395.7

(56) References Cited

U.S. PATENT DOCUMENTS

| | | | |
|---|---|---|---|
| 5,166,930 A | * 11/1992 | Braff et al. ............... | 370/235 |
| 5,278,825 A | 1/1994 | Wallmeier et al. | |
| 5,280,470 A | 1/1994 | Buhrke et al. | |
| 5,381,407 A | * 1/1995 | Chao ....................... | 370/233 |
| 5,430,721 A | 7/1995 | Dumas et al. | |
| 5,491,691 A | * 2/1996 | Shtayer et al. ........ | 370/395.42 |
| 5,504,741 A | * 4/1996 | Yamanaka et al. ........ | 370/412 |
| 5,533,020 A | * 7/1996 | Byrn et al. ............ | 370/395.4 |
| 5,535,201 A | * 7/1996 | Zheng ..................... | 370/231 |
| 5,729,529 A | * 3/1998 | Martinsson et al. ........ | 370/235 |

FOREIGN PATENT DOCUMENTS

| | | |
|---|---|---|
| EP | 573 739 | 12/1993 |
| EP | 609 114 | 8/1994 |
| EP | 632 622 | 1/1995 |
| WO | WO95/14266 | 6/1994 |

\* cited by examiner

*Primary Examiner*—Melvin Marcelo
*Assistant Examiner*—Jasper Kwoh

(57) ABSTRACT

When data cells are transmitted from a station and the cells belong to different logical connections, derived from various logical or physical sources, each source and thus connection may require a particular transmission rate, which is not to be exceeded. Then for each one of a number of successive time slots a queue is arranged, the first current queue being the one pointed to by a pointer. The time slot queues comprise in a consecutive order, identifiers of those connections for which a data cell is to be transmitted. The first position in such a queue indicates the connection, for which a data cell is to sent with the highest degree of priority. The following positions indicate connections which have lower degrees of priority in a decreasing order. The first data cell in the time slot queue (No. 1) as pointed to by the pointer is then transmitted from the station and a cell belonging to the same connection is added to that other queue (No. n+1), which has an adapted distance from the considered queue in the sequential order of queues, where this distance is calculated from the transmission rate for the connection, to which the transmitted cell belongs. After that the remaining part of the first queue (No. 1) is transferred to the next queue (No. 2) and placed in front of the all the items in this next queue. The first queue (No. 1) is thus empty and the pointer is stepped to point to this next queue (No. 2).

49 Claims, 7 Drawing Sheets

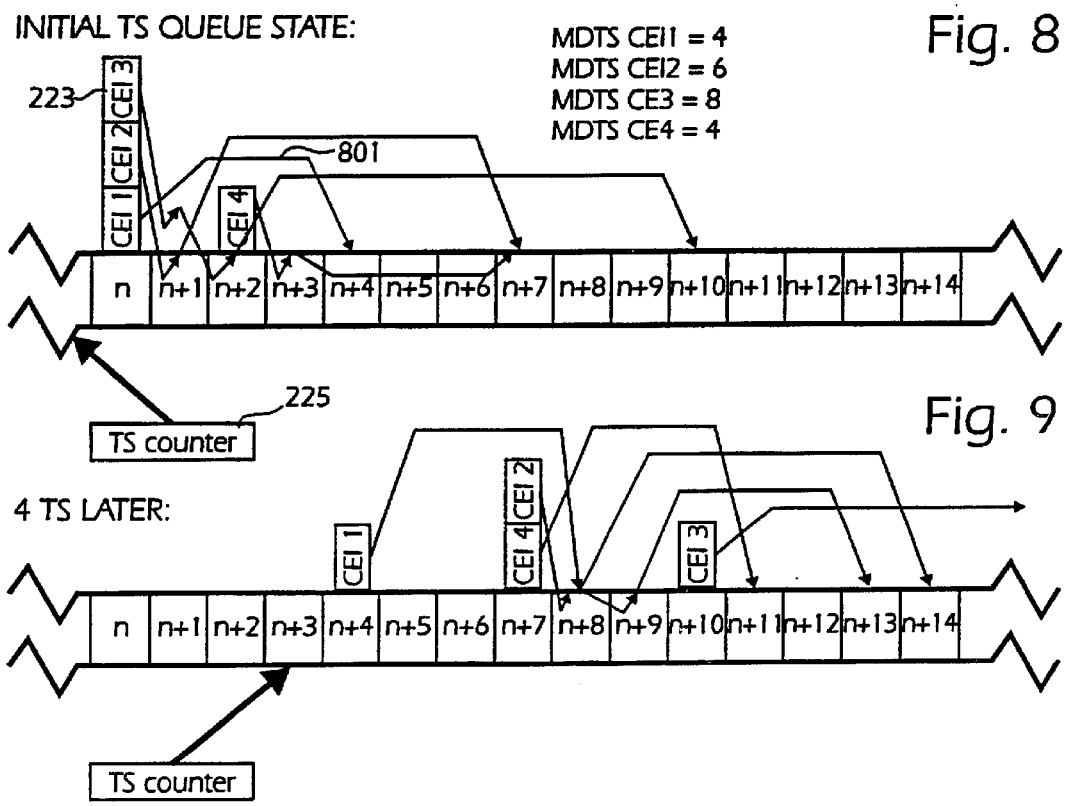
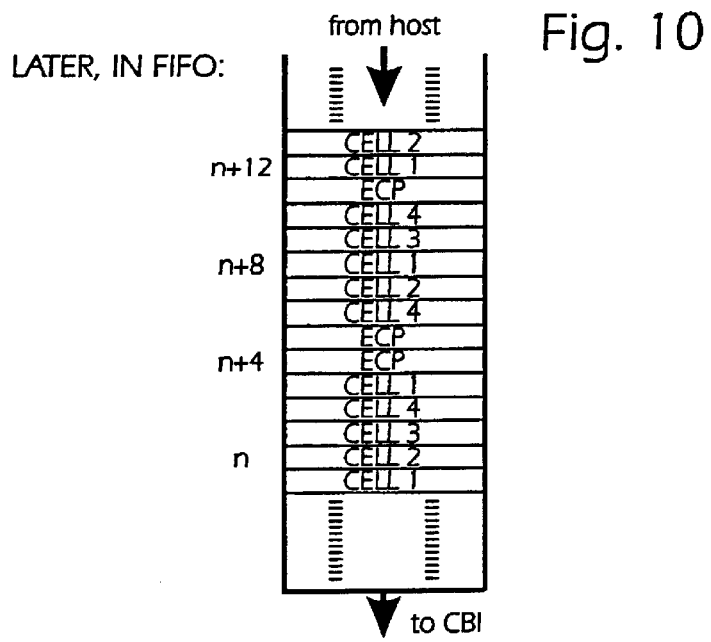

ATM THROTTLING

This application is a continuation of International Application No. PCT/SE96/00887, filed Jul. 5, 1996, which designates the United States.

TECHNICAL FIELD

The present invention relates to methods and devices for handling transmission of data cells from a node, where the cells belong to different channels and are transmitted from a station in predetermined rates specific for each channel.

BACKGROUND

In the transmission of calls or messages in an asynchronous network each call or message is divided in short cells or segments which are forwarded in the network, each cell then belonging to a specific call or message or generally to a particular logical connection. These connections are established when the call is made or the request is made for transmitting a message, e.g. a digital file, through the network. Depending on the user or requester of the transmission, each logical connection is assigned a predetermined transmission rate which is a fraction of the total transmission rate of cells for the nodes in the network, the magnitude of the fraction implying different costs for the user or requester. There is then a problem of issuing the data cells in these rates from a station into the network so that these predetermined rates are not exceeded. The same problem can also exist in nodes inside the network, where the transmission rates of the different logical connections can have been unbalanced by the fact that the cells can pass through different paths, that buffers may be full and some cells are then discarded, etc.

In the published patent European application EP-A1 0 609 114 a method is disclosed for transmission of cells in an ATM-network. The method comprises a number of steps including that in one of the steps the cells are separated by a least time interval representing a known time resolution. In another step the cells are separated by a least time interval representing the maximum allowed transmission rates for the respective user. The time separation is performed by means of different timers. For each separation of the first kind the cells are collected in a number of files of cells or lists of cells, which are transmitted successively. In the other separation, the cells having different allowed maximum transmission rates are distributed over the files or lists, for each transmission rate evenly or with an equal spacing over files or lists.

In the published International patent application WO-A1 94/14266 a system is disclosed for controlling the flow of cells through nodes in an ATM-network. The switches of the system which are equipped with both input and output buffers can, by means of throttling, control the flow of cells from the input buffers if an addressed output buffer is overloaded. In an embodiment each output buffer has a device detecting its fill level, the detected value being reported continuously for controlling the throttling. The purpose of the throttling is here primarily only for preventing overload or overflow of the output buffers.

Other systems using throttling in networks are disclosed in U.S. Pat. No. 5,280,470 and the published European patent application EP-A2 0 573 739.

SUMMARY

It is an object of the invention to provide methods and devices for handling transmission, from a considered point such as a station or node, of cells which belong to different logical connections, where all cells are transmitted at predetermined rates, the handling method and device requiring only simple hardware with an efficient use of memory areas.

In particular, it is an object of the invention to provide methods and devices for handling transmission of cells from a station or node, where predetermined rates, established for cells belonging to different logical connections, are not exceeded and cells are transmitted simultaneously from the station at the highest possible total rate.

In particular, it is a further object of the invention to provide methods and devices for handling transmission of cells from a station or node, where in the transmission of cells, in the case where the sum of predetermined rates, established for cells belonging to different logical connections, exceeds the total transmission rate of the station or node, or worded equivalently, exceeds the total transmission band width, all predetermined rates are decreased in a fair manner so that no connection will be more favoured than others, e.g. that no connection is blocked when the others are not, and in particular that all connections having the same predetermined rate are handled equally, none of them being given more transmission time than the others.

In particular, it is a still further object of the invention to provide methods and devices for handling transmission of cells from a point or station, where cells belonging to different logical connections or from different sources arrive to the station at different rates and at some time periods even no cells will arrive belonging to some connections, the transmission capacity is assigned to the connections based on their instantaneous needs, so that during those time periods, when there are cells ready to be transmitted a connection is given its share of the total transmission bandwidth, based on the predetermined rate of the connection, and in other cases when there are no cells, this bandwidth is used for transmitting cells from other connections, where the transmission from the connection is started rapidly thereafter when it has cells which are ready to be transmitted.

It is another object of the invention to provide methods and devices for transmission of cells from a station or node, where the transmission rates for cells belonging to different logical connections can be set with a high resolution and for every connection independent of all other connections.

It is a further object of the invention to provide methods and devices for transmission of cells from a station or node, where the transmission rate for cells belonging to a logical connection can be changed during the transmission of the cells.

It is a still further object of the invention to provide methods and devices for transmission of cells from a station or node, where the total handling time for handling the transmission of cells belonging to different logical connections will principally not increase, when the number of established logical connections increases, and where the amount of additional hardware required for the method and in the device is only moderate in the case, where the method and device are extended to handling more logical connections than before.

It is another object of the invention to provide methods and devices for handling transmission, from a station or node, of cells which belong to different logical connections, for which method and device all cells belonging to each connection are transmitted at a rate predetermined for each connection, the handling method and device giving a smooth cell flow out from the station or node.

Thus in a station or terminal for a network data cells are transmitted from the terminal and the cells are arranged to belong to different logical connections, which are derived from various logical or physical sources. Each source and thus connection is supposed to require a particular transmission rate, which is not to be exceeded and which can be changed. Then for each one of a number of successive time slots a queue is arranged, the first or current queue being the one which is pointed to by a pointer. The time slot queues comprise in a consecutive order, identifiers of those connections for which a data cell is to be transmitted, or they may in some special cases even contain the cells themselves. The first position in such a queue indicates the connection, for which a data cell is to be sent with the highest degree of priority. The following positions indicate connections which have lower degrees of priority in a decreasing order. The first or next data cell of the logical connection the identifier of which is the first one in the time slot queue as pointed to by the pointer is then transmitted from the station and an identifier of the same connection is added to that other queue which has a distance from the considered queue in the sequential order of queues, where this distance is calculated from the transmission rate which is particular for the connection, to which the transmitted cell belongs. After that the remaining part of the first queue is transferred to the next queue and placed in front of the all the items in this next queue. The first queue is thus empty and the pointer is stepped to point to this next queue.

Generally, data segments or cells are transmitted from a station, where each data segment preferably has the same length. Data are assumed to arrive at the station from various logical and/or physical sources or to belong to some logical connection. Each source is assumed to require or to been assigned a particular transmission rate for the data segments derived from the data arriving from this source, where this transmission rate is not to be exceeded for these data segments. The data segments are transmitted from the station one at a time and at successive times, in particular at periodic times.

For each one of successive times from a considered current time a logical or physical queue is arranged in special memory means provided therefor, where the first queue is the next or current one, as considered from the current time, the second queue is the queue immediately after the first, etc. Each of the queues comprises in a consecutive order, identifiers of those sources or connections for which a data segment of theirs is to be transmitted or it may instead contain the data segments themselves or addresses thereof, in the case where the actual segments are stored in some other memory means. The first position in such a queue indicates directly, or indirectly in the case where it contains a data segment or an address thereof respectively, the source or connection, for which a data segment is to be sent with the highest degree of priority, and the following, higher positions indicate sources which have lower degrees of priority in a decreasing order.

A first or next data segment from the source first indicated in the first queue or the first data segment in or as indicated first in the first queue is transmitted and after that the remaining part of the first queue is transferred, maintaining its internal successive order of queue items, to the next queue and placing it in front of all the items possibly already present in this next queue. Then the first queue is removed and the remaining queues are renumbered or moved, so that now the former second queue, the queue after the next one, will be the first one, etc. maintaining the sequential order of the queues.

Queues are preferably arranged for only a predetermined number of successive times and then, after the renumbering or moving of the remaining queues, a last queue is added to the set of queues, where this last queue is empty and in a cyclical way corresponds to the removed former first queue.

Also, an output buffer memory may be arranged and in this case, when a data segment is to be transmitted it is placed or an indication of the data segment is placed in the output buffer and then it is physically transmitted from the station and in this operation it or the indication thereof is retrieved and removed from the output buffer.

It may occur that the first queue is empty and then no data segment is transmitted. Obviously, a data segment could then be transmitted from the following queue, but it would violate the condition that the set transmission rates for the channels should not be exceeded, as will appear hereinafter. Instead, in the case where the first queue is empty, a special data segment or an indication thereof may be placed in the output buffer, this special data segment having such a construction or being such type that is easily recognized and will not be transmitted from the station.

The transmission from the station is preferably performed periodically, in uniformly distributed and equally long physical time slots, and then the transmission of data segments is made from the segments stored in or indicated in the output buffer sequentially, one segment at each of these periodically repeated times. In the case where the special data segment or an indication thereof is located at the next position in the output buffer where a data segment or an indication thereof should be stored and is to be transmitted, no data segment is transmitted at the corresponding periodic time. This may also be necessary for ensuring that the set transmission rates are not exceeded.

Immediately before or after the step of removing the first queue or after adding an empty last queue the following step is performed, which ensures generally the throttling. Then an identifier of the same data source or a next data segment or an address thereof from the same source, from which a data segment was transmitted, is added to that queue, which has a distance from the removed queue in the sequential order of queues, where this distance is determined from the transmission rate for the source, to which the data segment belongs. The addition is preferably made first in that queue.

In the case where a source or connection that has previously not had an identifier of itself or any of its data segments or addresses thereof in any queue, starts to be active, that is in the case where it gets at least one data segment to be transmitted from the station, an identifier of this source or connection or the next one of its data segments or an address thereof, is preferably added to the queue, which is the next one after the current one. The addition is preferably made last in that queue.

A station for carrying out the described steps then comprises transmission means for transmitting the data segments one at a time and at successive times, memory means for storing, for each one of successive times from a considered current time, a logical or physical queue, and suitably adapted control or processor means. The memory means may then be arranged for storing only a predetermined number of successive queues and in particular the memory means may be arranged for storing the queues in a cyclical manner and then a memory field is arranged to store a pointer pointing to a current one of the cyclically arranged queues. An output buffer can be provided for storing data segments or indications thereof before the actual transmission from the station. A special data segment or an indication thereof may be stored in a memory field arranged therefor to be copied to the output buffer to indicate an empty place, where so required, so that the transmission means will not, when this special data segment is found in the output buffer, transmit any data segment from the station. A memory field may be provided for each source or connection to hold a distance value or number determined from the transmission rate for the source.

In the case where the memory means for the queues comprise identifiers of sources, the memory means for storing the source identifiers are advantageously arranged as a linked list, including first memory means comprising fields for storing the first items in each queue, second memory means comprising fields for storing the last items in each queue and third memory means comprising fields in a sequential order. Each field in the third memory means has a sequential order number and they are arranged for storing next items in the queues, so that the sequential order number of a field indicates the item immediately before the item stored in the field.

BRIEF DESCRIPTION OF THE DRAWINGS

The invention will now be explained in detail by describing a specific non-limiting embodiment, with reference to the accompanying drawings, in which FIG. 7 is a flow diagram showing process steps performed by a transmission function, FIGS. 8 and 9 illustrate an example of the throttling process, FIG. 10 schematically shows a FIFO-memory used for transmission in the throttling example of FIGS. 9 and 10.

DETAILED DESCRIPTION

The invention is intended to be preferably carried out in an ATM network where digital or digitalized data are transmitted. A standard ATM cell contains 53 octets or bytes of digital data. A data packet can extend over several successive cells, but hereinafter only individual cells are considered. A call, message or digital data file can generally be transmitted in or through the network as one data packet and will thus always comprise several data cells and often a very large number of cells.

Figure 1:
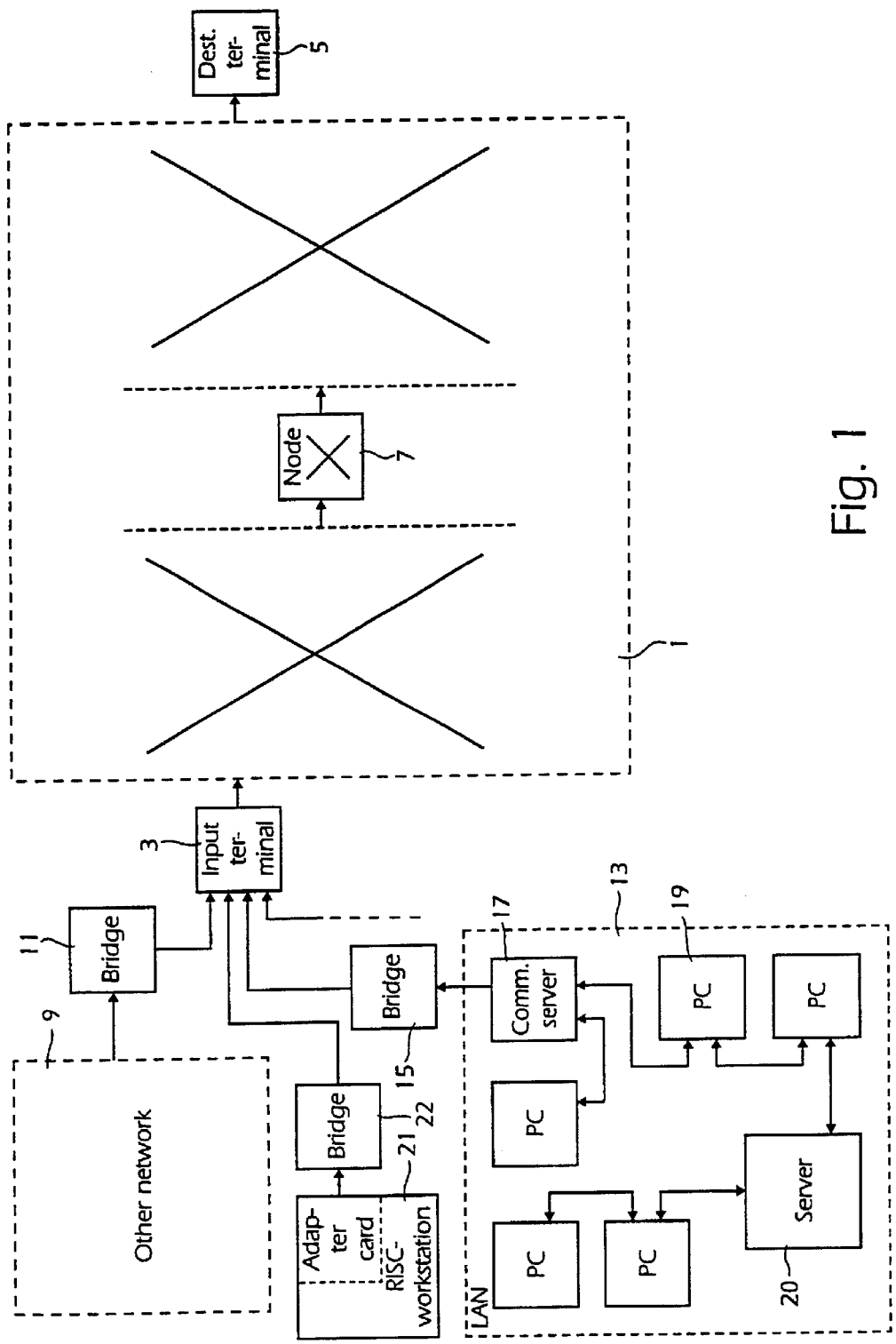
FIG. 1 is a schematic view of a network.

In FIG. 1 a network 1 of ATM type is schematically illustrated that is intended for the transfer of data packets from an input terminal 3 to an output or destination terminal 5. The terminals 3, 5 may generally be both transmitters and receivers of the data packets and they may be present in any number, but in the Figure only one transmission direction and one input terminal and one output terminal are illustrated. The network generally comprises a multitude of intermediate switching nodes or switches, of which one is illustrated at 7. The switching units 7 are thus connected to other similar switching nodes, not shown.

When a terminal station 3 requests to start issuing data packets into the network to the destination station 5, it will send some signal or message informing thereof to some switching node inside the network. This message also contains information requesting a specified transmission rate of the cells to be transmitted. Then a logical signal path through the network will be established by the exchange of various messages or control information between the switch units like 7 inside the network 1. When a connection path is established, a message or signal can be transmitted from the network 1 to the input terminal station 3, which has requested the connection, that the connection is now established and is ready to be used for the transfer of data packets from the input station 3.

The input or source terminal 3 may itself receive messages or calls or the like from various sources, e.g. from another type network 9 through a suited bridge 11 and from a local area computer network 13 through a bridge 15 connected to a communication computer or server 17 in the LAN 13, which also may comprise various personal computers or work stations 19, a main server 20, etc. A high-speed workstation 21 can also be connected to the input terminal 3 through a suitable adapter card or unit for the workstation and a bridge 22. The input terminal 3 can itself be an integrated part of a communication device, e.g. in the shape of an accessory board mounted in a dedicated communication server.

In the input terminal 3 particular processes must be provided for transmitting cells from different logical connections in the rates which have been set in establishing the connections. Of course, a source of data to be communicated normally wants the data to be transferred to the destination as fast as possible. However, the costs may be different for different transmission rates through a network. Also, the circuits and/or data storage means at the destination may not have the capacity of receiving data at a too high rate. Thus there is a need for a mechanism issuing data into the network at a maximum speed or rate, where this rate is allowed to be different for different needs and sources, and thus for different logical connections which are normally arranged in networks of the kind discussed herein. This may then raise another problem in the case where a data source requests to have its data transferred at a constant bit rate through the network. This may happen for e.g. sources issuing real time data like video data for movable pictures. A solution of this problem could be to allot such a source a maximum data rate which is equal to or slightly higher than that which would be required by the source in the case there was provided a direct data path, without switching nodes and not interfered with by other traffic, therefrom to the destination. Another solution could be to introduce the concept that for some channels the information passes directly through a network, in particular that the cells belonging to such a channel always are transmitted directly from the stations or node. This will increase the complexity of the system.

In the transmission of cells from the input terminal 3 the time is considered to be divided into preferably equally long time slots TS and in each such time slot either one cell or no cell is transmitted from the terminal. A typical distance between the beginnings of two successive time slots should then correspond to the order of magnitude of the maximum output rate for the considered output link, what for a transmission rate of approximately 10 Megabit/second gives 42.4 microseconds. The distance is also, accordingly, at least 2.73 microseconds for a link of 155 Megabit/second.

A maximum transmission rate is defined for each logical connection, the inverted value of which corresponds to a Minimum Distance between Time Slots, MDTS. This minimum distance can be expressed in multiples of the least possible time distance between successive cells in a considered network. If the transmission rate is assumed to be 10 Megabits/second with a minimum distance of two successive time slots of 42.4 μs, then an MDTS equal to 1 is equivalent to the maximum output rate, that is a cell time of 42.4 μs, which means that one cell belonging to the considered logical connection should maximally be transmitted in each time slot, that is no cells from other queues could then be transmitted. An MDTS=2 is equivalent to half the maximum output rate, that is 5 Megabits/second, an MDTS=3 is a third of the maximum output rate, that is 3.3 Megabits/second, etc.

The same processing as in an input terminal 3 can also be executed in an internal node 7 of the network 1, since a new throttling of the cell rates may be needed due to unbalanced characteristics of the ATM-network, where some nodes may sometimes be inactive, some cells may be lost, internal buffering of varying capacities in the nodes, etc. Otherwise, some logical connections may have their cells temporarily transferred at a too high velocity through the network.

Figure 2:
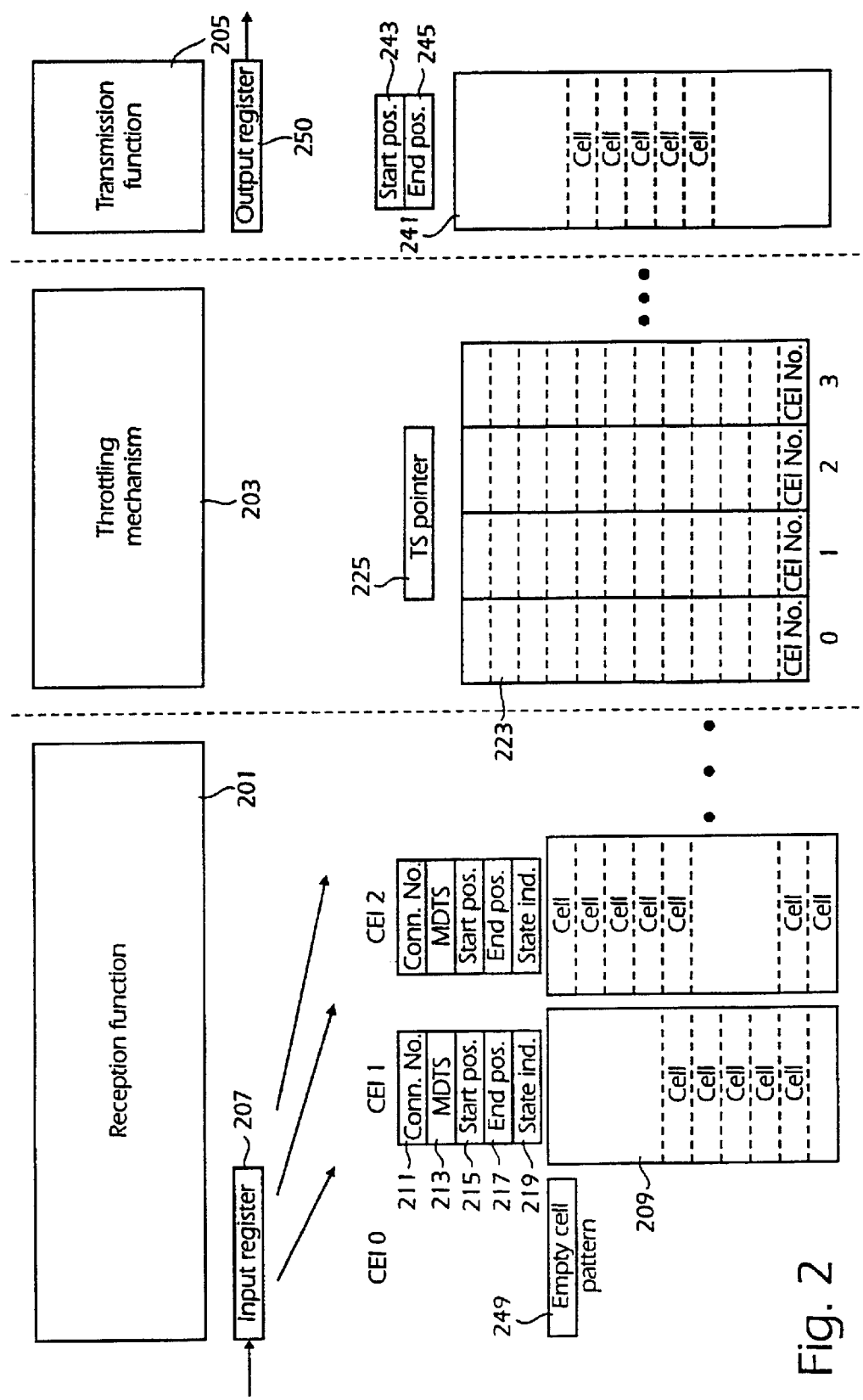
FIG. 2 is a block diagram of a terminal.

Those processes in an input terminal 3 or possibly in an internal node 7 which are considered here are a reception function 201, see FIG. 2, administrating messages, files, packets or cells respectively arriving at the terminal or node by a segmenting or division of the arrived data into suitable data segments such as ATM-cells. The reception function 201 manages the storing the cells in cell queues per logical connection, each having a connection identifier CEI, these identifiers then also defining each one a queue of cells associated with a considered connection. There is further in the input terminal or node a throttling process or mechanism 203, the purpose of which is to inform the transmission function or cell generator 205 which cells are to be transmitted so that the cells are forwarded in the predetermined rates. It can be done by supplying a list of output connection identifiers CEI to the transmission function 205. Thus, generally, the throttler process 203 need not exactly define the cell to transmit, but may only give the queue numbers or, equivalently, the logical connections, in a correct sequential order, so that in this case the transmission function takes the next connection number from the list and transmits the next cell in the queue arranged for this connection. However, hereinafter also a procedure will be described in detail for the output handling.

Figure 3:
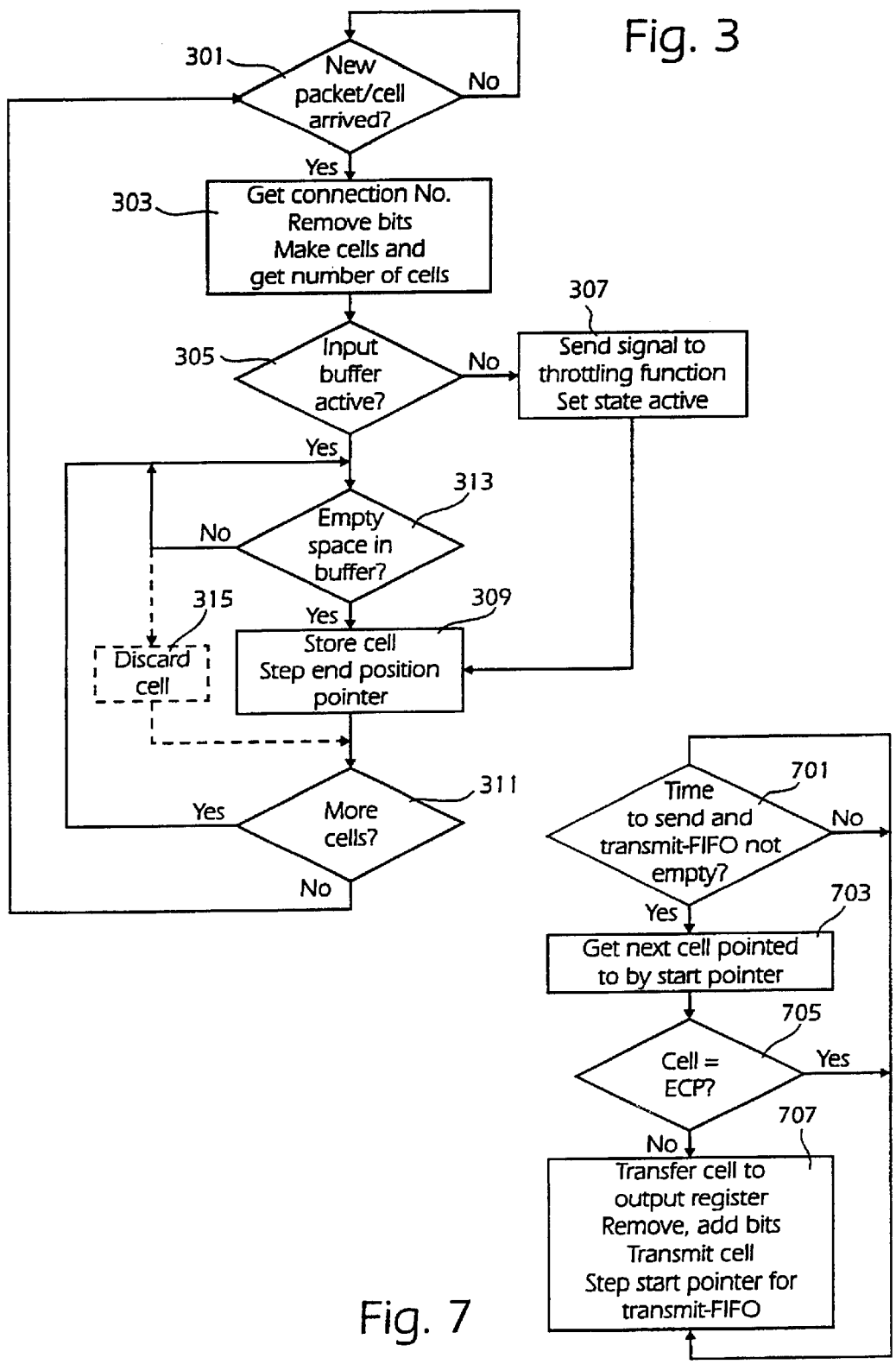
FIG. 3 is a flow diagram showing the function steps executed by the reception function.

The basic procedure performed in the reception function 201 is illustrated by the flow diagram of FIG. 3, the organization of the memory therefor being shown by fields or blocks at the bottom of FIG. 2.

Thus the reception function 201 handles the segmenting of data arriving at the input terminal or node and the storing of cells obtained from the data by storing the cells in queues arranged for the logical connections, which are currently present. Thus first, see FIG. 3, in a block 301 it is awaited that a data packet or cell should arrive to an input register 207 of the terminal or node, the cell or the cells of which are to be stored in the reception registers or input buffers 209, see FIG. 2. These buffers 209 are thus established, one for each currently active or open logical connection, and are also called CEI queues, suitably numbered 1, 2, 3, . . . or possibly having some other specific identification. For each such CEI queue there are registers or storage cells holding necessary data for administering the buffers, which preferably are cyclically organized. Thus the connection number of the cells in the buffer is stored in a register 211, the rate selector MDTS of the connection is stored in a register 213, a pointer to the first stored cell in the buffer is stored in a field 215, and a pointer to the next position in the buffer where a new cell can be stored is stored in a register 217. In a field 221 an indicator for active state is stored, indicating whether the queue is active, that is whether the queue participates in the throttling process. The cells which are stored in a buffer 209 have not yet been transmitted from the station or node and a cell which is physically sent by the transmission function 205 is according to one embodiment always removed at that instance or in a preferred case such a cell is removed earlier from its CEI queue 209 as will be described hereinafter.

When it is then decided in the block 301 that there is some information to be forwarded from the station, such as that a new packet or cell has arrived, the new information is processed in a block 303 and the information is assigned a logical connection number. Some logical connection number or equivalent data pointing to or implying a logical connection number can be extracted or retrieved from the packet or cell, for instance from the header portion of an ATM-cell, according to the protocol used. Then also some bits in the header or the entire header of a packet or cell can be removed, if required. The number of ATM-cells generated by the received data is also calculated. The logical connection number of the arrived data could also be determined in other ways, e.g. by hardware signals.

Then it is determined in a block 305 whether the input buffer for the logical connection of the information is active, that is if it participates in the throttling process and thus is present in any TS queue, to be described hereinafter. It is done by testing the indicator for active state stored in the memory field 221. If it is inactive, in a block 307 a signal is sent to the throttling function 203 telling that the considered queue now has become active again, and also the state indicator in the field 221 is changed to indicating that the queue is active. In a block 309, then a cell is stored in its associated buffer 209 at the position specified by the end position pointer stored in the field 217 and the end position pointer is then incremented one step cyclically. Then it is determined in a block 311 whether there are more cells to be stored. If it not the case, the start block 301 is executed again. However, if there is another cell to be stored, a block 313 is executed where it is decided whether there is space in the considered buffer for another cell. It is made by comparing the start and end position pointers stored in the fields 215 and 217 respectively. If they are equal the buffer is full and then the procedure can wait until there is an empty space in the buffer, by returning repeatedly to this block 313. Alternatively, the cell can be discarded, as suggested by the block 315 drawn in dotted lines.

Figure 4:
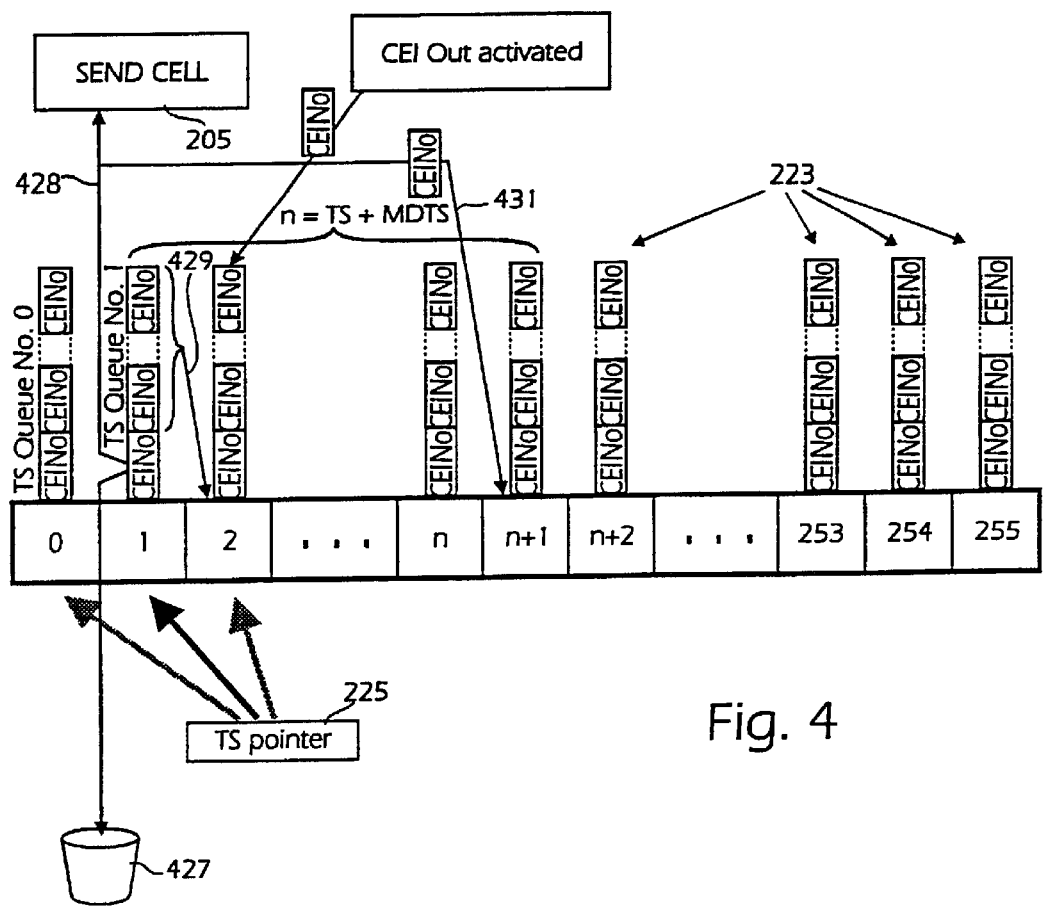
FIG. 4 illustrates the cell throttling principle.

The operations performed by the throttling mechanism 203 are illustrated in FIG. 4, it being the critical step of the considered output handling, producing a queue of data cells to be forwarded in such a way that the previously ordered or commanded bit rates for each logical connection are achieved or at least and in any case not exceeded. As illustrated in the picture of FIG. 4, there are a number of queues 223, called TS queues, each queue being associated with a considered, successive time slot TS which will physically occur at some time after the considered, present time. There is finite number of TS queues 223, see also FIG. 2, and they may then be arranged cyclically, and in the example of FIG. 4 there may be supposed that there are 256 queues. A TS pointer stored in a memory field 225 points to the next present or considered TS slot queue 223. Then from a considered starting time, i.e. that one to which the TS pointer in the field 225 points, each one of the next following time slots is associated with a corresponding TS queue 223, then such queues being arranged for the next 255 successive time slots. A TS queue 223 contains a list of numbers of CEIs, that is identification numbers of input queues 209, and it can be either empty or contain one or several CEI numbers. The CEI numbers in the TS queues or lists 223 are all different, that is each CEI number can only occur once in all of the CEI queues. The CEI numbers in a TS queue or lists 223 are arranged in a sequential order, the first CEI in a list pointing to the input buffer which at this time slot is next in turn or has the highest priority to be transmitted from the station.

The CEI numbers need not be entered physically in a separate time slot queue or list 223 for each logical connection, as suggested by the picture of FIG. 4, but they may advantageously be connected to a logical TS queue, only existing as the number thereof, via a linked list, as will described hereinafter. In the latter case then, each logical TS queue has one beginning of queue pointer and one end of queue pointer pointing to the first CEI number and the last CEI number respectively in the considered TS queue.

The physical number of TS queues which need to be arranged depends basically on the ratio between the smallest throttling rate, which can be assigned to a connection, and the total throttling rate of the station, and in the example described herein with a total transmission rate of 10 Megabit/second and standard channels of multiples of 64 kilobit/second a typical value could for instance be 256 TS queues. That means that at any moment, all time slots TS that have a position in time of 256 timeslots and later after the present, current time slot have empty, that is non-existent, queues.

The number of a CEI queue 209 which at the present time does not contain any cell to be transmitted, that is is not active, is normally not present in any TS queue 223. The identification number of a CEI queue which first has nothing to send and then gets cells to send is at a certain moment written into one of the TS queues 223, as will be described below and is signalled by the reception function 201 in the block 319 as has been described above.

The procedure when the throttling machine 203 is supposed to find a CEI queue from which the next cell is to be sent is:

1. The TS pointer stored in the field 225 is incremented by one step, normally equal to 1.
2. If the TS queue 223 to which the pointer 225 now points, is empty, no cell will be transmitted at this TS. As is indicated by the arrow pointing to the bucket 427 in FIG. 4, it is somehow signalled to the transmission function 205 that no cell will be transmitted during this time slot.
3. If the TS queue 223 which is indicated by the pointer stored in the register 225, is not empty, the first, that is the start or next cell of the first CEI queue listed in this TS queue 223 is moved to the cell transmission function 205, as indicated by the arrow 428 and the block 205 of FIG. 4. The first cell is the one pointed to by the pointer stored in the field 215 for this CEI queue. In one embodiment to be described in detail below the considered cell is moved to a transmit queue of the transmission function in the case where the transmit queue is not full.
4. The rest of this TS queue 223, if the queue contained more than one number of CEIs, is pushed, as indicated by the arrow 429, in front of the TS queue 223 of the next successive time slot, i.e. of the TS queue having the number TSP+1, where TSP is the current value of the time slot pointer as stored in the field 225. The current TS queue 223 then becomes empty.
5. The cell transmission function 205 sends in the simplest case directly, starting at the next physical time slot available on the output side of the station, the cell obtained in the manner described above from the throttling function 203. Also, the CEI number of this cell is pushed, as is indicated by the arrow 431, in front of the TS queue of the time slot having the time position number (TSP+MDTS), where TSP is the time position number of the current, considered TS queue, as given by the current value of the TS pointer in the field 225 and MDTS, given in a number of time slots, as defined above is the Minimum Distance between Time Slots for this CEI queue and as stored in the register 213. If the cell transmission function 205 finds out that the queue 209 of this CEI has no cell to send at this instance, i.e. it is an empty cell queue, nothing or at least no useful information will be sent on this time slot and this CEI number is not written back to any later TS queue 223. This case could also possibly be detected earlier, during the selection, made by the throttling function 203, of the considered CEI queue from which a cell is to be forwarded. A signal can then in any case be sent to the reception function 201 informing that this CEI queue 209 now should be inactive, that is that the state indicator stored in the field 221 of this CEI queue can be set accordingly to indicate a non-active state.

When a cell gets ready to be sent from a CEI queue 209, as handled by the reception function 201, compare block 307 of FIG. 3, this queue not already being present in any TS queue 223, this CEI value is added to the TS queue 23 from which a cell is next to be sent, i.e. to the TS queue having the number (TSP+1), in the preferred case inserted after possible other CEI queue numbers present in this TS queue. In the case where this TS queue is empty, this first cell of the activated queue will then be transmitted in the next TS, meaning that the transmission from a new queue or a queue, which has returned to an active state, is started immediately.

According to the description above, a CEI number will be written back into a later TS queue 223 also when the last cell currently in the CEI packet queue 13 has been transmitted or at least has been transferred to be handled by the transmission function 205. This CEI number will instead be removed from the TS queues, i.e. not written back, at the next time when the throttling machine 203 selects this CEI as the one from which a cell is to sent, but of course, only in the case where no new cell in the meantime has been entered in the considered CEI queue 209, compare blocks 317 and 319 of FIG. 3. The reason for this is to guarantee a cell distance of at least MDTS also for the case when a new packet, that is a group of cells, is ready for transmission just after the last cell of the previous packet was transmitted. That means that when the cells of a new packet get ready for throttling and transmission and the CEI value is not already written into or found in any TS queue, it is possible to select the earliest possible time slot for transmission of the first cell of the packet. Otherwise, it could occur that a source would feed the station with packets or cells in a suitable rate such that first always one, the only cell in the queue was transmitted, the queue was then found empty and then immediately there was a new cell to send from the queue, throttling this cell to the next successive time slot.

This means however, that one time slot will "get lost" each time when a CEI identification number or a CEI queue 209 is removed from the TS queue system. This effect should be taken into account when defining the time distance between time slots, i.e. the total throttling rate out of the system.

Figure 5:
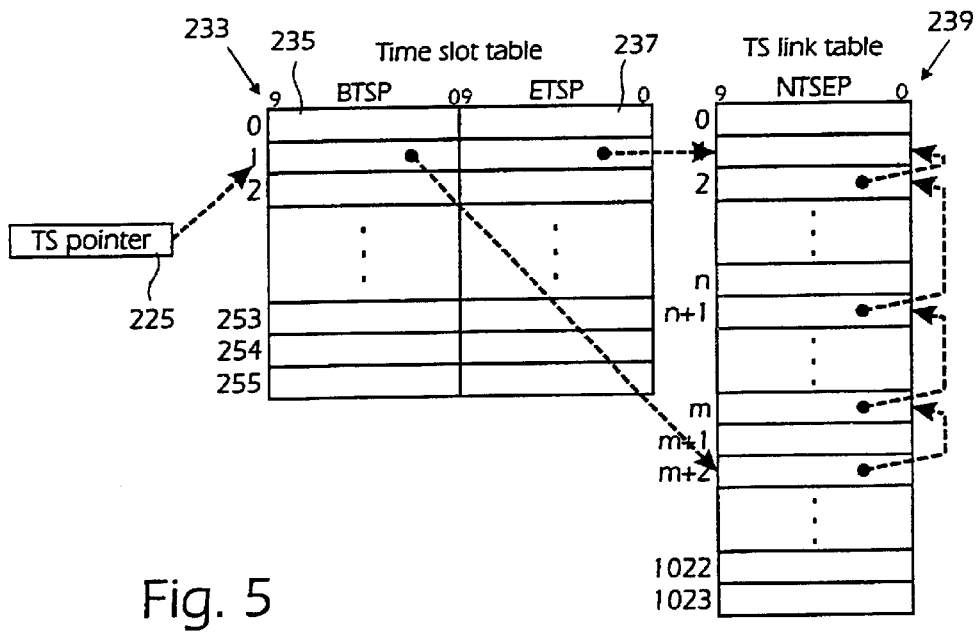
FIG. 5 shows logical queues and their interconnection.
Figure 6:
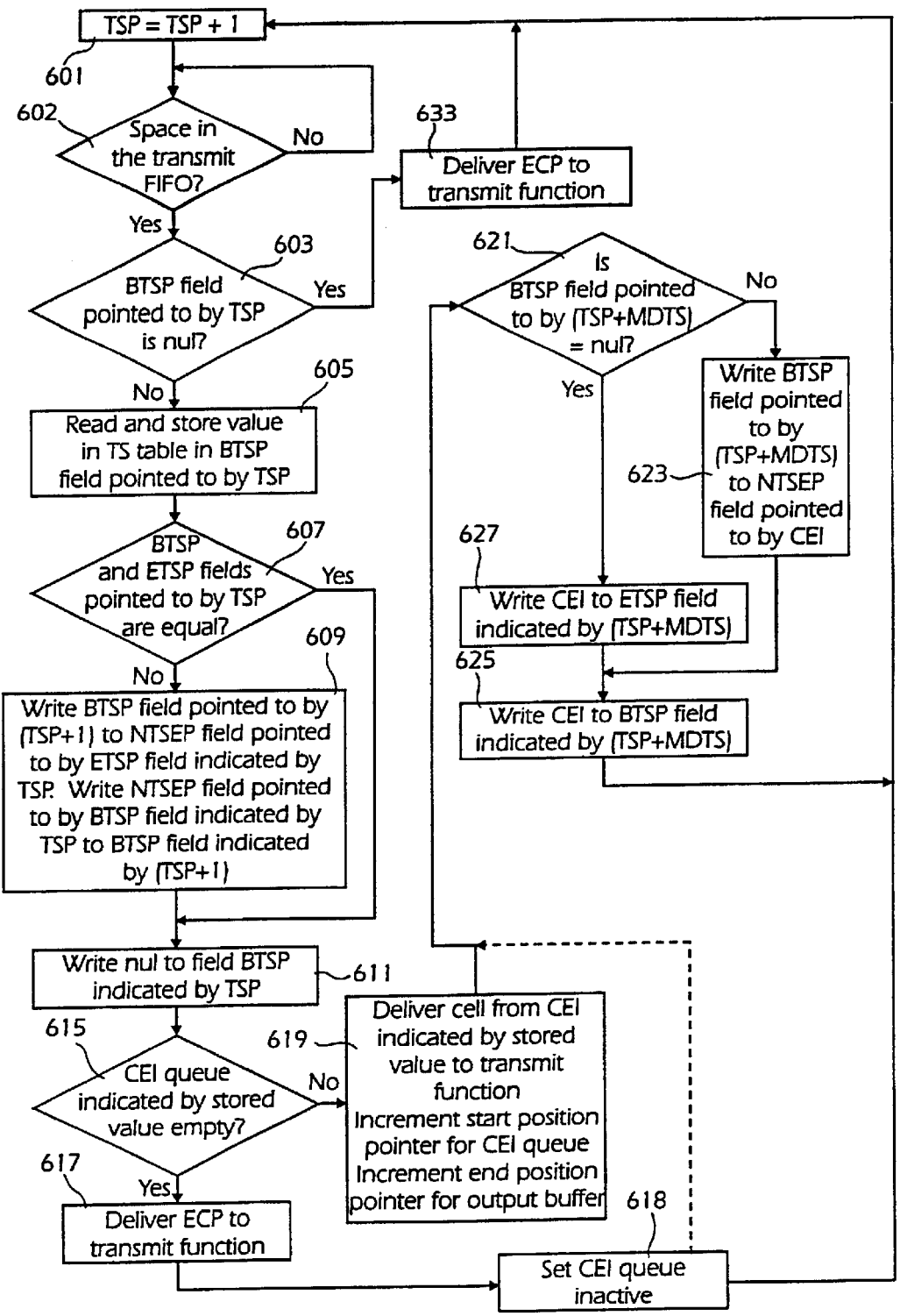
FIG. 6 is a flow diagram showing processes for modifying throttling queues.

The TS queues 223 may not be physical lists or memories, as has already been indicated, but can, since each CEI queue number occurs maximally once in the TS queues 223, be replaced by a linked list as illustrated by the schematic picture of FIG. 5 which is drawn for the particular case of 256 TS queues 223 and maximally 1024 positions in each TS queue, allowing thus maximally 1024 established logical connections to be handled. The corresponding flow diagrams of the TS queue handling are shown in FIG. 6. The TS queues 223 of FIGS. 2 and 4 are thus here substituted by a TS queue table 233 comprising for each successive time slot TS two pointers BTSP 235 and ETSP 237 and one TS link table 239 comprising pointers NTEP pointing to another positions in this table 239 itself. The first pointer 235 BTSP, Beginning of TS Queue Pointers, in the TS table 233 points to a position in the second table, the TS link table 239, the number or address of this position in this second table 239 then being the CEI number of a queue 209 from which a cell first should be sent for this time slot queue, the time slot or time slot queue being the address or number of the field containing the considered pointer BTSP in the TS queue table list 233.

Then, in the position in the TS link table 239 to which the considered BTSP points, there is a pointer NTSEP, Next TS Queue Entry Pointer, pointing to another position in the TS link table 239, this pointer also indicating the next CEI queue 209 from which a cell is to be sent. Then, in the same way, the position in the TS link table 239, to which said pointer points, contains a similar pointer to another position in the same table 239, this pointer also indicating the next CEI queue 209, from which a cell is to be sent. This is repeated in this way, until, in a position in the TS link table 239, there is a pointer identical to the pointer ETSP, End of TS Queue Pointers, in the second field 237 for the considered time slot, this being the last pointer in that TS queue and a pointer to the last CEI queue from a cell is to be sent.

An empty TS queue is indicated by giving the beginning pointer BTSP some easily identifiable value, such as the logical value "nul". Also the value 0 can be used, pointing to the empty cell pattern queue. For a TS queue holding only one CEI number the pointers BTSP and ETSP are equal.

In FIG. 6 a flow diagram is shown for the handling of the next time slot queue 223, performed by the throttling function 203, as illustrated in FIG. 4, in particular as indicated by the arrows 428 and 429 and the bucket 427, and using the linked list of FIG. 5. The procedure starts in a block 601, where the time slot pointer TSP stored in the field 225 is incremented by one step. A block 602 is then executed, where it is sensed, whether it is possible to send the cell now, or as is illustrated, according to another preferred alternative, whether there is a free space in a transmit buffer of the transmission function 205. In the case where it is not possible or there is no space, the same block 602 is repeated until the question of the block gives the answer yes, and then in a block 603 the pointer BTSP in the field 235 of the TS queue table 233 is accessed and it is tested if the value thereof is nul. If it is not, the present TS queue is not empty and then in a block 605 the pointer value which is a CEI queue number, is temporarily stored in a suitable register, not shown. Then in a block 607 it is decided whether the accessed pointer is equal to the corresponding end pointer, i.e. the pointer ETSP in the field 237 of the TS queue table 233. If it is not the case, it means that the considered TS queue contains more than one record or CEI queue number, and then a block 609 is performed where the linked list for the next time slot as indicated by the time slot pointer value (TSP+1) is modified. First the pointer BTSP at this next time slot (TSP+1) is written to the field NTSEP in the position in the TS link table 239 as pointed to by the ETSP pointer at the current TSP. Then, in the BTSP field 235 of the next time slot as indicated by the value (TSP+1) the linked CEI number in the NTSEP field of the link table as pointed to by the pointer BTSP of the current TSP. Then in a block 611, which is also performed in the case where the determination in the block 607 gave a positive answer, that is if there is only one CEI number in the TS list, in the BTSP pointer in the field 233 for the current time slot the value nul or the value for CEI No. 0 is written, its value being also conveniently equal to zero.

The CEI queue having identification number zero, CEI No. 0, is used, as been suggested above, for indicating an empty position or that nothing is to be transmitted and it contains an address pointer to an empty cell pattern stored in a register 249, see FIG. 2. Then a block 615 is executed, where it is tested whether the CEI queue as indicated by the value temporarily stored in the block 605 is empty. If it is empty, a block 617 is executed where an empty pattern is sent to the transmission function 205 and then in block 618 the indicator for active state of the considered CEI queue 209 as stored in the field 221 is set to indicate that the CEI queue is not active any longer. Then the TS pointer incrementing step 601 is executed again.

If it is decided in the block 615, that the selected CEI queue is not empty, the next cell, that is the cyclically first cell, is delivered to the transmission function 205, for instance to be stored in the transmit FIFO memory, as illustrated by a block 619. Then also the start position pointer stored in the field 215 for this CEI queue in the reception function 201 is incremented one step. The procedure can stop here and wait until the transmission function 205 has time to send or when it is time to send the next cell.

As has already been mentioned, an output buffering can be used, as is suggested in FIG. 2. Then in the block 619 a cell from the selected input buffer 209 (or possibly an address thereof) is written to the last position of an output FIFO memory 241 or transmit queue. Like the input buffers or queues 209 the transmit memory 241 can conveniently be a cyclical memory, the start of occupied positions being indicated by a start pointer stored in a memory field 243 and the position after the last occupied position being indicated by an end pointer stored in a memory field 245. Then here also, in the block 619, this end pointer 245 is incremented cyclically one step.

For the test of the block 602, thus the start and end position pointers in the fields 243 and 245 may be compared, some device being provided for distinguishing between the cases where the output FIFO 241 is empty or full. For instance, an equal value of the start and end positions pointers may be taken to always indicate an empty state of the buffer and a value of the start position pointer being cyclically directly after the value of the end position pointer may be taken to indicate that the memory is full.

After the accession and delivery of a cell to the transmission function 205 in the previous steps, in particular after the block 619, the very procedure essential to the throttling is performed, where a CEI queue number is added to a later TS queue 209, compare the arrow 431 in FIG. 4. Thus, in a block 621 it is decided whether the TS queue associated with this later time slot, as obtained from the considered one and added thereto the number MDTS in the field 213 for this CEI queue 209, symbolically indicated by the number (TSP+

MDTS), is empty. If it is determined not to be empty, a block 623 is executed, where the value or pointer of the BTSP field at this later time slot queue is written to the NTSEP field in the TS link table 239 at the position indicated by the CEI queue identification number. Then in a block 625 the considered CEI identification number is written to the beginning of queue pointer BTSP in the field 235 for this later time slot queue (TSP+MDTS). After that, the proper throttling function has been completed by the rearrangement of the TS queues and the next TS queue 223 will be handled by executing the block 601 where the TS pointer is incremented.

If it was decided in the block 621, that the considered beginning of queue pointer BTSP is equal to nul or zero, a block 627 is executed, where the current CEI value, i.e. the value which was used in the delivery of a cell to the output FIFO queue 241 in the block 619, is written to the end pointer ETSP field 237 for this later time slot queue at (TSP+MDTS). After the block 627 the block 625 is performed as above.

If it was decided in the block 615 that the considered CEI queue is empty, in the block 617 this special case is indicated to the cell transmitter 205, as has been already mentioned, by delivering a special empty cell position ECP pattern, e.g. as stored in a memory 249.

If it was decided in the block 603, that the present TS queue is empty, a block 633 is executed, where this fact is signalled to the transmit function 205, such as by transferring an empty cell pattern thereto as has been discussed above. Then a new time slot queue will be handled by incrementing the time slot pointer in the block 601.

One small change in the algorithm as described above can be made for the case including a transmission FIFO-buffer 241. The case to consider is when the throttling function 203 finds a CEI queue 209 from which it is allowed to transmit, but that this CEI has an empty cell queue 209 and thus has nothing to send, compare blocks 615 and 617 of FIG. 6. Instead of writing an ECP into the output FIFO 241, it would be possible for the throttling function 203 to find a new CEI queue 209, from which it is allowed to send on this TS, however this being applicable only for the case when there are more than one CEI queue number in the time slot queue 223 of the current TS pointed to by the TS pointer stored in the field 225.

Also other options are possible on a detailed level. One example is that it is not necessary to remove a CEI queue number from the TS queues 223 when there are no more cells to send from this queue, compare the block 618 of FIG. 6. This possibility is indicated by the dotted arrow from the block 618. This is possible for the case when the sum of the rates of all established connections is less than the maximum total throttling or total physical transmission rate. A drawback would be the required time to administrate all CEI queue numbers in the TS queues also at times of low output traffic. Another drawback is that a new cell cannot be throttled immediately producing a delay. One possible advantage could be that each CEI queue could find a fixed TS pattern at which it is not disturbed by other CEI queues. This requires a certain allocation of MDTS values to make this fixed pattern possible to achieve.

Most of the throttling algorithm may, for moderate maximum transmission rates, be implemented in software in the throttling mechanism 203, this software being for instance included in or including the relatively small software portions which can be arranged for the two other mechanisms, the reception function 201 and the transmission function 205, if they are not hard-wired constructions. The parts of the cell handling as described above which are most memory-consuming are in any case the memory areas for the input buffers 209. However, for high transmission rate applications hardware constructions are necessary, and the various processes described herein may then, in the conventional way, be executed by specialized state machines implemented in digital signal processors particularly constructed for the purpose. The input buffers can be replaced by a random storage memory requiring an address list of empty spaces and address lists instead of the input buffers 209.

By arranging a transmit FIFO 241, as has been described above, and by giving this memory a satisfactory size it is possible to avoid cell-by-cell real time handling by the throttling function 203. The TS pointer in the throttling mechanism 203 as stored in the register 225 will then not reflect the exact real or physical output time. Instead the corresponding real time will occur when the cell is eventually transmitted at the physical output interface by the transmission function 205. The time lag between the TS queue indicated by the TS pointer in 225 and the real time slot will then depend on the current fill level of the transmit FIFO 241.

To achieve the correspondence between the value of the TS pointer in field 225 of the throttling mechanism 203 and the real time slot at the physical output interface of the station, it is necessary that the processor of the throttling mechanism 203 can indicate for the cell transmitter 205 each time when a cell is not to be transmitted at a certain TS. This can be achieved, as been mentioned above, by providing to the transmission function a special empty cell position ECP pattern stored in the memory 249.

For the handling of the total cell flow the following necessary partial functions may be identified:

1. A transmission function 205 for controlling the entire cell flow to the transmit output register.
2. A fixed cell header pattern, which indicates an empty cell position, ECP. The throttler function 203 and the transmit function 205 should count this pattern logically as one cell, but the pattern is not transmitted physically from the station or node.
3. Some way of counting the number of empty cell positions in the output FIFO 241, this function being for instance provided by the start and end position pointers stored in the memory fields 243, 245, that is of determining the fill level of the output buffer 241. An indicator could be set or a signal provided to the throttling mechanism for signalling "output buffer full", then halting the throttling mechanism for a suitable time. By this arrangement it is possible to let the state machine or processor of the throttling mechanism 203 fill the output FIFO 241 with cell bursts.

The writing into the transmit FIFO 241 must cease, compare the discussion of the block 602 of FIG. 6 above, when the fill level, as indicated by some fill counter, has reached a predetermined threshold. This threshold corresponds to a certain maximum cell latency time, and is proportional to the time it takes until the output FIFO 241 goes empty in case it is not refilled. Normally, to achieve a good throttling performance, it is necessary for the throttling mechanism 203 to avoid that the transmit FIFO 241 goes empty. At times when there is nothing to send, the throttling mechanism 203 will feed the output FIFO 241 with ECP patterns. In the case where anyway the FIFO 241 goes empty, the cell transmission function 205 can restart as soon as the first cell is written into the output FIFO 241. The throttling function 203 could thus let the output FIFO 241 go empty in the case where it knows that there are no cells to transmit, i.e. there are no CEIs in the TS throttling queues 223 or there are no active CEI queues 209.

A flow diagram of the procedure performed by the transmission function 205 in the embodiment where an output FIFO 241 is used, is shown in FIG. 7, the procedure starting in a block 701, where it is tested whether it is now the next time for physically sending a cell from the terminal or node and it is also tested whether there is at least one cell or ECP stored in the output FIFO 241. In the case where any of these two conditions is not satisfied, the same block is executed again. If instead the conditions fulfilled, that is when the time for sending is achieved and the output FIFO memory is not empty, the next cell stored in the transmit FIFO 241, as pointed to by the start pointer stored in the register 243, is accessed in a block 703. Then this cell is tested in a block 705, if it is the empty cell pattern ECP (CEI queue No. 0). If it is the case, the block 701 is performed again for awaiting the next time to send and for testing that the output FIFO is not empty, otherwise in a block 707 this next cell is physically sent from the station, which includes that it is transferred to an output register 250, from which it is transmitted from the station. Finally in the block 707 the start position pointer stored in the field 243 for the transmit FIFO 241 is incremented cyclically by one step.

An example of a transmission case in respect of the throttling mechanism is shown in FIGS. 8, 9 and 10. Here there are four active CEI queues 209, CEI No. 1–CEI No. 4, having the MDTSs of 4, 6, 8, 4 respectively. In the initial state, as illustrated in FIG. 8, time slot queue No. n comprises three items, the queues CEI 1, CEI 2 and CEI 3. In time slot queue No. (n+2) there is only the CEI queue No. 4. In this state the TS pointer in field 225 points to the TS queue No. n.

Before the TS pointer as stored in 225 is incremented cyclically to point to the next TS queue No. (n+1), a next cell from CEI queue No. 1 is placed in the output queue or transmit FIFO. Then also the CEI queue No. 1 is placed in the TS queue No. (n+4), as prescribed by the MDTS value of this CEI queue and as indicated by the arrow 801. The remaining CEI queues in the TS queue are transferred to the next TS queue (n+1), that is this new TS queue will comprise the CEI queues having Nos. 2 and 3 respectively.

Before the TS pointer in the field 225 is stepped again, the next cell from CEI queue No. 2 will be entered in the transmit FIFO 241, CEI queue No. 2 will be added to TS queue No. (n+7), and the CEI queue No. 3 will be pushed into or inserted before all other CEI queue numbers in the next TS queue having the number (n+2). When the TS pointer 225 is stepped to point to this TS queue, the cyclically first cell of CEI queue No. 3 is sent to the FIFO memory 241, CEI queue No. 4 is pushed to the next TS queue (n+3) and CEI queue No. 3 is added to the TS queue No. (n+10). For the next step of the TS counter 225 when it points to (n+3), the first or next cell of CEI queue No. 4 is inserted in the transmit FIFO 241 and the identification number of CEI No. 4 is added to TS queue No. (n+7). When then the TS pointer 25 points to TS queue No. (n+4), as is illustrated in FIG. 9, this queue only contains CEI queue No. 1 and the next cell of this CEI queue is sent to the transmit FIFO and the CEI number (=1) is added to TS queue No. (n+8), etc.

Figure 11:
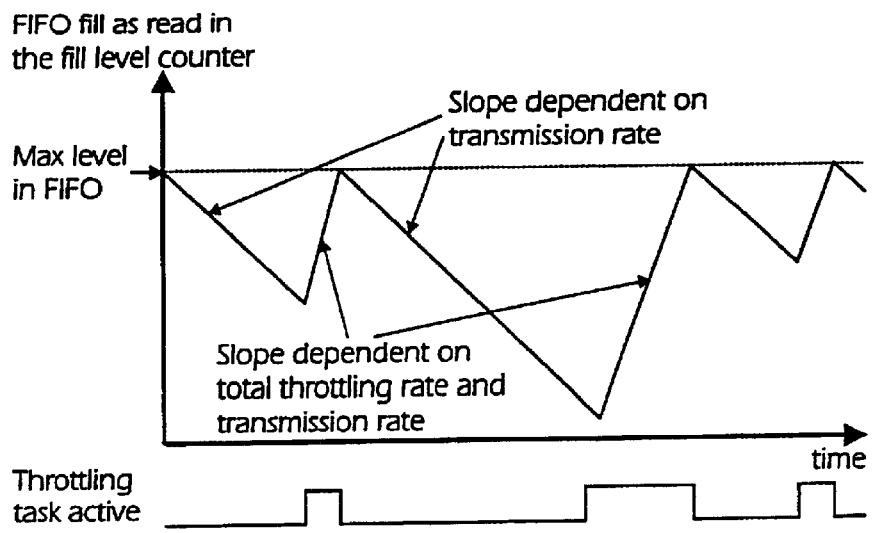
FIG. 11 shows an example of a time diagram of the filling level of the FIFO-memory.
Figure 12:
FIG. 12 shows, for the example of FIG. 11, a time diagram of the activity for the transmit task.

An example illustrating how the fill level in the transmit FIFO 241 can fluctuate is shown by the diagram of FIG. 11. The fill level is illustrated as a curve comprising straight line segments, the upper endpoints of the segments being located at the maximum fill level, the upper threshold level of the memory. The transmission function 205 can be assumed to be always working at a constant rate, reading one cell or ECP from the output FIFO 241 at each time slot. The throttling mechanism 203 is however assumed to be active only at some short intermittent time intervals, these intervals being illustrated by the activity curve of FIG. 12. Further, the handling by the throttling mechanism 203 of each TS queue 223 can be assumed to always require a for instance substantially constant or equal time period resulting in a very high throttling rate during the activity periods of the throttling mechanism 223.

During the times, when the throttling mechanism 203 is active and thus also the transmission function 205 is active too, since it is constantly working, the fill level of the transmit FIFO increases at a constant rate, up to the maximum fill level, and it decreases at a constant rate during the time periods when the throttling mechanism 203 is inactive and only the transmit function is working. When the maximum fill level is reached, the transmit FIFO 241 cannot accept any more cells and then there is a wait or delay period, when the throttling mechanism 203 has to be inactive waiting that there will be empty space in the output FIFO 241. In the case of FIG. 11 it is assumed that when the maximum fill level of the transmit buffer is reached, some signal is issued to stop the throttling function 203. This can also be achieved by the throttling mechanism itself by performing a suitable test of the output buffer, compare the discussion of the block 602 of FIG. 6.

The throttling task can be restarted at any time and a signal can for instance be sent to the throttling task when the output FIFO is close to empty. The issuing of such a signal could then be made suitably in the block 707 of FIG. 7. Alternatively a signal from a timer circuit can be used for the restart of the throttling mechanism.

The advantages of the throttling mechanism as described above compared to the normal rate queue solution:

- a smooth cell flow at the physical output interface (comfortable for the ATM switch, which can easily be multiplexed with cell flows from other modules),
- simple hardware,
- rates which can be set individually per connection with high resolutions,
- no delay for the first cell in a packet or message, in the output FIFO case except the transmission time for cells already waiting in the output FIFO,
- true peak allocators, i.e. cells are never transmitted more closely than a certain guaranteed distance,
- it is easy to change the rate of a connection during operation, for congestion control or for mean throttling.

What is claimed is:

1. A method for transmitting data segments from a station, where in each data segment has the same length, where data arrives to the station from various sources, each source having a particular transmission rate for the data segments derived from the data arriving from the source, where this transmission rate is not to be exceeded for those data segments, the data segments being transmitted from the station one at a time and at successive times, in particular periodically, comprising the steps of:

arranging a plurality of queues for each one of successive times from a considered current time, the plurality of queues being consecutively numbered, each one of the queues comprising in a consecutive order, identifiers of at least one of the sources for which a data segment is to be transmitted, the data segments themselves, and addresses thereof, the first queue indicating the source for which a data segment is to be sent with the highest degree of priority, the other queues indicating sources which have lower degrees of priority in a decreasing order;

transmitting one of a first and a next data segment from one of the source first indicated in the first queue, the first data segment in the first queue, and the first data segment indicated first in the first queue;

transferring the remaining part of the first queue to the second queue and placing it in front of all the items in the second queue;

removing the first queue and renumbering the remaining queues, so that the second queue becomes the first queue and maintaining the sequential order of the queues; and adding at least one of an identifier of the same data source, a next data segment, and an address thereof from the same source, from which a data segment was transmitted, to that queue, which has a distance from the removed queue in the sequential order of queues, where this distance is determined from the transmission rate for the source, to which the data segment belongs.

2. A method according to claim 1, wherein queues are arranged for only a predetermined number of successive times, the method then comprising as the last step finally adding a last queue to the set of queues, this last queue being empty.

3. A method according to one of claim 1, wherein when a data segment is to be transmitted one of the data segment and an indication of the data segment is placed in an output buffer, from which it is physically transmitted from the station.

4. A method according to claim 1, wherein when the first queue is empty, no data segment is transmitted.

5. A method according to claim 3, wherein when the first queue is empty, one of a special data segment and an indication thereof is placed in the output buffer, this special data segment not being transmitted from the station.

6. A method according to claim 5, wherein in the case where the transmission is made periodically, transmission of data segments is made from the segments stored in the outer buffer sequentially, one at each of periodically repeated times, and in the case where the special data segment or an indication thereof is located at the next position in the output buffer where a data segment should be stored and is to be transmitted, no data segment is transmitted at the corresponding periodic time.

7. A method according to claim 2, further comprising the step of:

adding one of an identifier of the same data source, an identifier of a next data segment, and an address thereof from the same source, from which a data segment was transmitted, to that queue, which has a distance from the removed queue in the sequential order of queues, where this distance is determined from the transmission rate for the source, to which the data segment belongs.

8. A method according to claim 1, wherein the addition is made first in that queue.

9. A method according to claim 1, comprising the additional step of adding, in the case where a source that has previously not had an identifier of itself or any of its data segments or addresses thereof in any queue, has at least one data segment to transmit, an identifier of itself or the next one of its data segments or an address thereof, to the queue, which is the one after the current one.

10. A method according to claim 9, wherein the addition is made last in that queue.

11. A method for transmitting data segments from a station, each one having the same length, wherein data arrives to the station from various sources, each source having a particular transmission rate for the data segments derived from the data arriving from the source, where this transmission rate is not to be exceeded for those data segments, the data segments being transmitted from the station one at a time and at successive times, comprising the steps of:

arranging a plurality of queues for each one of successive times from a current time, the plurality of queues being consecutively ordered from the current time, each one of the queues comprising in a consecutive order, identifiers of at least one of the sources for which a data segment is to be transmitted, the data segments themselves, and addresses thereof, the first queue position indicating a source, for which a data segment is to be sent with the highest degree of priority, the other positions indicating sources which have lower degrees of priority in a decreasing order, transmitting one of a first and a next data segment from one of the source first indicated in the first queue, the first data segment in the first queue, and the first data segment indicated first in the first queue;

adding at least one of an identifier of the same data source, a next data segment, and an address thereof from the same source, from which a data segment was transmitted, to that queue, which has a distance from the removed queue in the sequential order of queues, where this distance is determined from the transmission rate for the source, to which the data segment belongs, removing the first queue and renumbering the remaining queues, so that the second queue becomes the first queue and maintaining the sequential order of the queues.

12. A station for transmitting data segments therefrom, where in each data segment has the same length, where data arrives to the station from various sources, each source having a particular transmission rate for the data segments derived from the data arriving from the source, where this transmission rate is not to be exceeded for those data segments, the station comprising:

transmission means for transmitting the data segments one at a time and at successive times;

memory means for storing a plurality of queues for each one of successive times from a considered current time, the plurality of queues being consecutively numbered, the memory means having fields for storing, for each one of the queues comprising in a consecutive order, at least one of identifiers of those sources for which a data segment is to be transmitted, the data segments themselves, and addresses thereof, the first queue indicating by holding a data segment or an address thereof belonging to it, the source, for which a data segment is to sent with a highest degree of priority, the other queues indicating in the same way sources which have lower degrees of priority in a decreasing order;

control means, wherein the control means transmits one of a first and a next data segment in the queue indicated in one of the first position in the first queue, the data segment as stored, and the data segment as indicated in the first position in the first queue, transfers the remaining part of the first queue to the second queue and places it in front of all the items in this next queue, and removes the first queue and renumbers the remaining queues, so that the second queue becomes the first queue, maintaining the sequential order of the queues; and wherein the control means are arranged to perform an addition of at least one of an identifier of the same data source, a next data segment, and an address thereof from the same source, from which a data segment was transmitted, to that queue, which has a distance from the queue removed to the sequential order of queues, where this distance is determined from the transmission rate for the source, to which the transmitted data segment belongs.

13. A station according to claim 12, wherein the memory means are arranged for storing only a predetermined number of successive queues, the control means being arranged also to add, after removing the first queue and renumbering, a last queue to the set of queues, this last queue being empty and stored in the fields of the removed queue.

14. A station according to claim 13, wherein the memory means are arranged for storing the queues in a cyclical manner, a memory field being provided for storing a pointer pointing to a current one of the queues.

15. A station according to claim 12, further comprising an output buffer, the control means being arranged, when a data segment is to be transmitted, to place it or an indication thereof in the output buffer, from which it is physically transmitted from the station, and the transmission means being arranged to transmit data segments stored in the output buffer in a first in-first out manner.

16. A station according claim 12, wherein the control means are arranged to sense when the first queue is empty and then not to transmit any data segment.

17. A station according to claim 15, wherein the control means are arranged to sense when the first queue is empty and then to place a special data segment or an indication thereof in the putout buffer, the transmission means being arranged, when this special data segment is found in the output buffer, not to transmit any data segment from the station.

18. A station according to claim 13, wherein the control means am arranged to add, after adding a last queue, an identifier of the same data source or a next data segment or an address thereof from the same source, from which a data segment was transmitted, to that queue, which has a distance from the queue removed or to be removed respectively considered in the sequential order of queues, where this distance is determined from the transmission rate for the source, to which the transmitted data segment belongs.

19. A station according to claim 12, wherein the control means are arranged to make the addition first in that queue.

20. A station according to claim 12, wherein the memory means for storing the source identifiers are arranged to store a predetermined number of queues, the queues being organized cyclically in a sequential order, a register being arranged for storing a pointer indicating the considered current queue, the pointer being updated by the control means when the current queue is removed.

21. A station according to claim 12, wherein the control means are arranged to perform the additional step of storing, when a source that previously has not had an identifier of itself or any of its data segments or addresses thereof respectively stored in any of the memory means for the queues, has at least one data segment to transmit, an identifier of that source or the next one of its data segments or an address thereof, in the memory means for the queue, which is the next one after the current one.

22. A station according to claim 21, wherein the control means are arranged to store the new identifier or the next one of the data segments or an address thereof respectively last in that queue.

23. A station according to claim 12, wherein the memory means are arranged for queues comprising identifiers of sources that are arranged as a linked list, and the memory means includes first memory means comprising fields for storing the first items in each queue, second memory means comprising fields for storing the last items in each queue, third memory means comprising fields in a sequential order, each field having a sequential order number, the fields being arranged for storing next items in the queues, the sequential order number of a field indicating the item immediately before the item stored in the field.

24. A method of transmitting data segments from a station, wherein data arrives at the station from a plurality of at least one of logical and physical sources, each of the plurality of sources having a particular transmission rate for the data segments derived from the data arriving from the respective source, wherein the particular transmission rate is not to be exceeded for said data segments, the data segments being transmitted from the station one at a time and at successive times, the method comprising the steps of:

arranging a plurality of queues, wherein each of the plurality of queues is associated with one of a plurality of successive times, each of the queues including in a consecutive order identifiers of at least one of the sources for which a data segment is to be transmitted, the data segments themselves, and the addresses thereof, the queues having a plurality of queue positions, the first queue position indicating the source for which a data segment is to be sent with the highest degree of priority, the other positions indicating sources which have lower degrees of priority in a decreasing order;

transmitting a next data segment from the source first indicated in the first queue;

transferring after that the remaining part of the first queue to the second queue and placing it in front of all the items in the second queue;

removing the first queue and renumbering the remaining queues, maintaining the sequential order of the queues; and repeating the steps of transmitting, transferring and placing, and removing and renumbering.

25. The method of claim 24, wherein the successive times are periodic.

26. The method of claim 24, wherein, in the step of arranging queues, queues are arranged for only a predetermined number of successive times, and the method further comprising the additional step of:

directly after the step of removing and renumbering, adding a last empty queue to the plurality of queues.

27. The method of claim 24, wherein, in the step of transmitting, in the case where the first queue is empty, no data segment is transmitted.

28. The method of claim 24, wherein, in the step of transmitting, a data segment to be transmitted is placed or an indication of the data segment is placed in an output buffer, from which it is then physically transmitted from the station.

29. The method of claim 28, wherein, in the step of transmitting, in the case where the first queue is empty, a special data segment or an indication thereof is placed in the output buffer of the station, the special data segment not being transmitted from the station.

30. The method of claim 29, wherein in the step of transmitting, the transmitting of data segments is made periodically from data segments sequentially stored in the output buffer, one at each of periodically repeated times, and in the case where the special data segment or an indication thereof is located at the position in the output buffer where a data segment should be stored and is to be transmitted, no data segment is transmitted at the corresponding periodic time.

31. The method of claim 24, comprising a further step executed immediately before or after the removing of the first queue:

adding an identifier of the same data source or a next data segment or an address thereof from the same source, from which a data segment was transmitted, to that queue, which has a distance from the removed queue in the sequential order of queues, where this distance is determined from the transmission rate for the source, to which the data segment belongs.

32. The method of claim 26, comprising a further step executed directly after the step of adding a last empty queue:

adding an identifier of the same data source or a next data segment or an address thereof from the same source, from which a data segment was transmitted, to that queue, which has a distance from the removed queue in the sequential order of queues, where this distance is determined from the transmission rate for the source, to which the data segment belongs.

33. The method of claim 31 or 32, wherein, in the step of adding and identifier or address, the adding is made first in the queue.

34. The method of claim 24, comprising a further step of:

adding, in the case where a source that has previously not had an identifier of itself or any of its data segments or addresses thereof in any queue, starts to be active and has at least one data segment to transmit, an identifier of the source or a next one of its data segments or an address thereof, to the second queue.

35. The method of claim 34, wherein in the step of adding, the adding is made last in the queue.

36. A method of transmitting data segments from a station, data arriving to the station from a plurality of logical or physical sources, each source requiring or being assigned a particular transmission rate for the data segments derived from the data arriving from the source, where this transmission rate is not to be exceeded for those data segments, the method comprising the steps of:

arranging a plurality of logical or physical queues associated with successive times, the queues comprising a first queue associated with a first of the successive times, a second queue associated with a second time of the successive times following directly the first of the successive times, each of the queues comprising in a consecutive order, identifiers of those sources for which a data segment of theirs is to be transmitted or the data segments themselves or addresses thereof, a first position in the queues indicating directly, or indirectly in the case where it contains a data segment or an address thereof respectively, the source, for which a data segment is to be sent with the highest degree of priority, the other positions indicating sources which have lower degrees of priority in a decreasing order;

transmitting a next data segment from the source first indicated in the first queue or the first data segment in or as indicated first in the first queue;

adding an identifier of the same data source or a next data segment or an address thereof from the same source, from which a data segment was transmitted, to that queue, which has a distance from the removed queue in the sequential order of queues, where this distance is determined from the transmission rate for the source, to which the data segment belongs; and removing then the first queue and renumbering the remaining queues, maintaining the sequential order of the queues.

37. A station for transmitting data segments therefrom, data arriving to the station from a plurality of logical or physical sources, each source requiring or being assigned a particular transmission rate for the data segments derived from the data arriving from the source, where the particular transmission rate is not to be exceeded for those data segments, the station comprising:

transmission means for transmitting the data segments one at a time and at successive times;

memory means for storing a plurality of logical or physical queues, each of the logical or physical queues being associated with one of successive times from a first time, the memory means having fields for storing, for each one of the queues, in a consecutive order identifiers of those sources for which a data segment of theirs is to be transmitted or the data segments themselves or addresses thereof, the first queue position indicating directly, or indirectly by holding a data segment or an address thereof belonging to it, the source, for which a data segment is to sent with the highest degree of priority, the other positions indicating in the same way sources which have lower degrees of priority in a decreasing order; and control means for transmitting a first or next data segment in the logical queue indicated in the first position in the first queue;

for then transferring the remaining part of the first queue to the next queue and placing it in front of all the items in this next queue, for then removing the first queue and renumbering the remaining queues, maintaining the sequential order of the queues.

38. The station of claim 37, wherein the memory means are arranged for storing only a predetermined number of successive queues, the control means being arranged also to add, after removing the first queue and renumbering, a last queue to the set of queues, this last queue being empty and stored in the fields of the removed queue.

39. The station of claim 38, wherein the memory means are arranged for storing the queues in a cyclical manner, a memory field being provided for storing a pointer pointing to a current one of the queues.

40. The station of claims 37, further comprising an output buffer, the control means being arranged, when a data segment is to be transmitted, to place it, or an indication thereof in the output buffer, from which it is physically transmitted from the station, and the transmission means being arranged to transmit data segments stored in the output buffer in a first in-first out manner.

41. The station of claim 37, wherein the control means are arranged to sense when the first queue is empty and then not to transmit any data segment.

42. The station of claim 41, further comprising an output buffer, wherein the control means are arranged to sense the case when the first queue is empty and then to place a special data segment or an indication thereof in the output buffer, the transmission means being arranged, when this special data segment is found in the output buffer, not to transmit any data segment from the station.

43. The station claim 37, wherein the control means are arranged to perform, before or after removing, the first queue, an addition of an identifier of the same data source or a next data segment or an address thereof from the same source, from which a data segment was transmitted, to that queue, which has a distance from the queue removed or to be removed respectively considered in the sequential order of queues, where this distance is determined from the transmission rate for the source, to which the transmitted data segment belongs.

44. The station of claim 38, wherein the control means are arranged to add, after adding a last queue, an identifier of the same data source or a next data segment or an address thereof from the same source, from which a data segment was transmitted, to that queue, which has a distance from the queue removed or to be removed respectively considered in the sequential order of queues, where this distance is determined from the transmission rate for the source, to which the transmitted data segment belongs.

45. The station of claim 43, wherein the control means are arranged to make the adding first in the queue.

46. The station of claim 37, wherein the memory means for storing the source identifiers are arranged to store a predetermined number of queues, the queues being organized cyclically in a sequential order, a register being arranged for storing a pointer indicating the considered current queue, the pointer being updated by the control means when the current queue is removed.

47. The station of claim 37, wherein the control means are arranged to perform the additional step of storing, when a source that previously have not had an identifier of itself or any of its data segments or addresses thereof respectively stored in any of the memory means for the queues, starts to be active and has at least one data segment to transmit, an identifier of that source or the next one of its data segments or an address thereof, in the memory means for the second queue.

48. The station of claim 47, wherein the control means are arranged to store the new identifier or the next one of the data segments or an address thereof respectively last in that queue.

49. The station of claim 37 for the case where the memory means are arranged for queues comprising identifiers of sources, wherein the memory means for storing the source identifiers are arranged as a linked list comprising:

first memory means comprising fields for storing the first items in each queue;

second memory means comprising fields for storing the last items in each queue; and third memory means comprising fields in a sequential order, each field having a sequential order number, the fields being arranged for storing next items in the queues, the sequential order number of a field indicating the item immediately before the item stored in the field.

* * * * *